Oct. 13, 1931.  W. W. WEIDLER  1,827,499
SCALE MECHANISM
Filed July 15, 1929
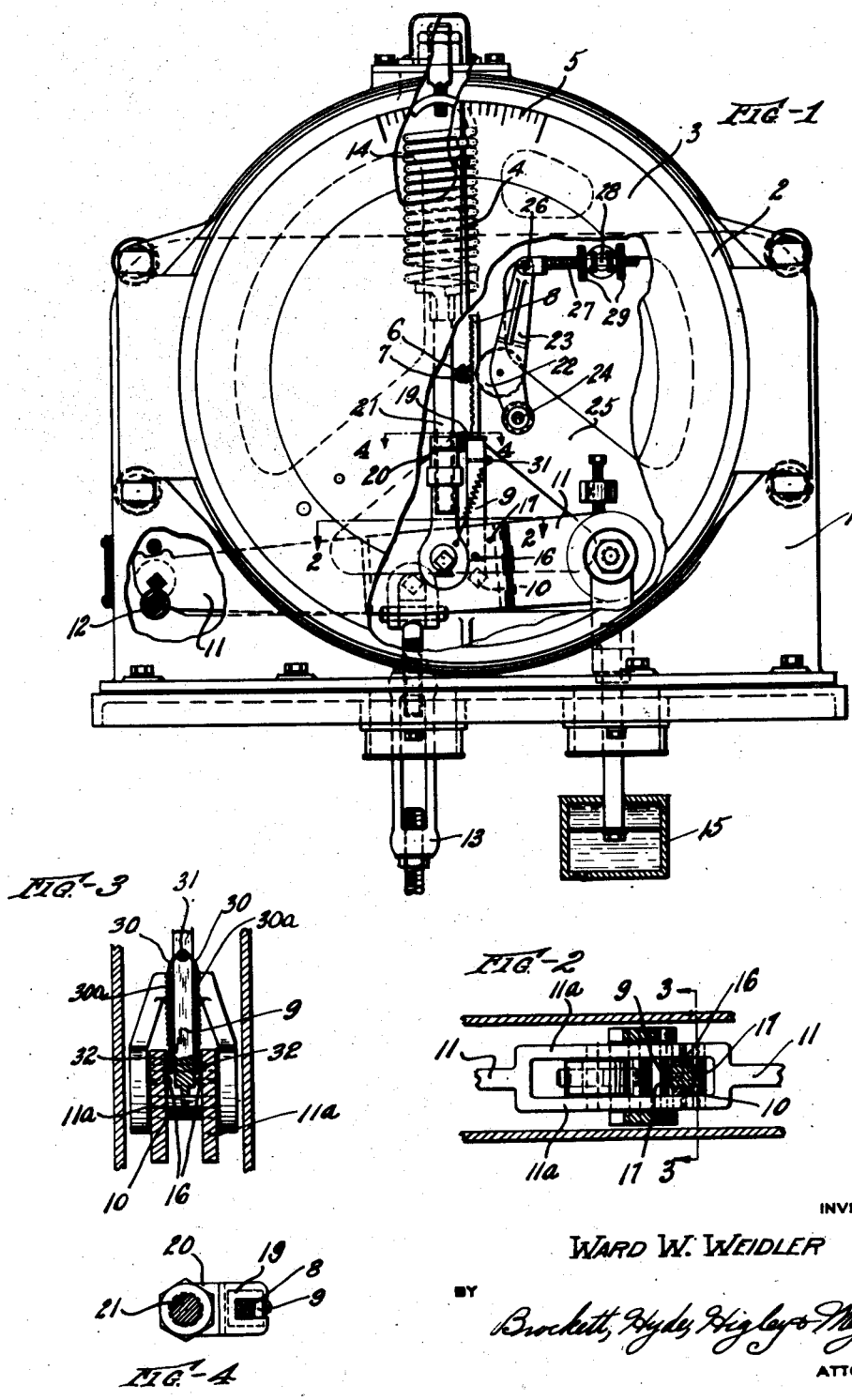
INVENTOR
WARD W. WEIDLER
BY
Brockett, Hyde, Higley & Mayer
ATTORNEYS Patented Oct. 13, 1931

1,827,499

UNITED STATES PATENT OFFICE

WARD W. WEIDLER, OF CLEVELAND, OHIO, ASSIGNOR TO THE ATLAS BOLT & SCREW COMPANY, OF CLEVELAND, OHIO, A CORPORATION OF OHIO

SCALE MECHANISM

Application filed July 15, 1929. Serial No. 378,545.

This invention relates to scale mechanism such as is used for heavy duty, as on railway cars and the like. The invention has particular relation to that form of scale in which the scale beam or weighing lever communicates its motion to the rotating hand or pointer by rack and pinion movement, its object being to provide means for supporting and guiding the rack and securing proper meshing relation between rack and pinion, as well as to hold the rack to its seat on the beam, all in a manner to avoid sticking of the parts, such as ordinarily occurs by the lodgement of dirt or foreign matter in closely fitting places.

Other objects of the invention are in part obvious and in part will appear more in detail hereinafter.

In the drawings, which represent one embodiment of the invention, Fig. 1 is a front view, part of the casing being broken out to expose interior mechanism.

Fig. 2 is a sectional plan view on the line 2—2, Fig. 1.

Fig. 3 is a detail sectional elevation on the line 3—3, Fig. 2.

Fig. 4 is a detail sectional plan view on the line 4—4, Fig. 1.

In the main, the scale shown in the drawings and embodying the present invention is of the same form described, illustrated and claimed in a prior patent of Eugene W. Schellentrager for weighing indicator, granted April 15, 1930, No. 1,755,078 to which reference may be had for a more complete disclosure thereof if desired. For the purposes of this application it is sufficient to say that the scale mechanism embodies a suitable frame 1 forming an enclosing casing for all of the mechanism, or at least its more delicate parts, such casing including a door 2 provided with a transparent window 3 through which is visible the rotating pointer 4 travelling over the scale 5. The pointer 4 is mounted on a shaft 6 carrying a pinion 7 engaged by a rack 8 attached to a counterweight or heavy base member 9 resting upon a knife edge 10 in a divided portion of the scale beam or lever 11 pivoted in the frame at 12 and connected to the load by the linkage 13, which exerts a pull on said lever opposed to the pull of a spring 14, movement of the lever and connected parts being cushioned or dampened by a dashpot 15.

The present invention has to do more particularly with the operation, mounting and effects of the rack member, which includes as a single unit both the upper rack part 8 and the heavy counterweighted base 9. The latter, at its lower end is notched out in V-form to rest upon the knife edge 10 and lies between the parallel parts 11a of the beam 11, which are provided with small buttons 16 to more or less closely confine, although they do not touch, the rack base 9. Said rack is also confined between two small pins 17 extending across between members 11a so that its lower end lies in a more or less rectangular cavity between the pins 17 and abutments 16. It cannot move laterally in any direction, or at least sufficiently to drop down at one side of the knife edge 10. It is prevented from jumping upwardly under abnormal shocks or impulses by a small fork or bifurcated arm 19 on a member 20 carried by the rod 21 to which spring 14 is connected.

Means is provided for guiding the upper or rack portion of the bar and maintaining it in meshing relation with the pinion 7, the particular means shown for the purpose including a roller or wheel 22 having its periphery slightly grooved so that it embraces the rack member 8, said roller being carried on a lever 23 pivoted at 24 in a stationary part 25 of the frame, the upper end of said lever being pivoted at 26 to a rod 27 passing through a small post 28 on the frame, on either side of which it is threaded to receive the check nuts 29. With this arrangement, adjustment of the check nuts on the more or less fine threads of the rod 27 enables the roller 22 to be nicely and accurately adjusted toward and from the rack.

In prior constructions the foregoing adjustment has been made very fine, even to two or three thousandths of an inch, closely confining the rack and pinion in meshing relation, but with the disadvantage of the rack sticking and failing to move downwardly in case a very small fragment of dirt, soot, or the like became lodged either in the rack and pinion teeth or between the rack and the roller 22.

According to the present invention I apply to the rack a very light spring which is effective directly upon the rack and specifically in a diagonal direction, to wit, downwardly and toward the pinion 7, so that said spring not only tends to hold the rack to its seat on the knife edge 10 and to move it downwardly toward the same, but also tends to very lightly press the rack teeth against the pinion teeth. With this arrangement the same guiding roller 22 may be employed but it need not be adjusted so close to the rack, being spaced therefrom even as much as one-hundredth of an inch or more, the clearance now being sufficient to avoid the sticking effect of dirt and foreign matter. For this purpose I preferably use a light coiled tension spring of generally U-form, with an intermediate portion 30 having a loop around a small screw 31 threaded into the rack counterweight, while the opposite coiled portions 30a of the spring are led down along the opposite sides of the rack counterweight, their ends being provided with small hooks 32 hooked around or through openings in one of the guide pins 17, or any suitable part of the lever 11. This arrangement, with a very light spring of proper tension, exerts a definite tendency to hold the rack to its seat on the knife edge 10 and with its teeth in proper mesh with the pinion 7, but nevertheless without introducing friction or drag into the mechanism, which might affect the accuracy of its indicating or weighing effects.

What I claim is:

1. Scale mechanism comprising a weighing lever having a knife edge, a movable indicating member, an operating pinion therefor, and means for operatively connecting said weighting lever and said pinion including a rack member having a heavy counterweighted base loosely supported on the knife edge of said lever, an adjustable backing member for said rack member, and a light tension spring extending from said rack member diagonally downwardly to a relatively fixed point and effective directly upon said rack member for pressing the same towards said pinion and also holding the rack member yieldingly to its seat on said knife edge.

2. Scale mechanism comprising a weighing lever having a knife edge, a movable indicating member, an operating pinion therefor, and means for operatively connecting said weighing lever and said pinion including a rack member having a heavy counterweighted base loosely supported on the knife edge of said lever, an adjustable backing member for said rack member, and a light tension spring extending from said rack member diagonally downwardly to a relatively fixed point and effective directly upon said rack member for pressing the same towards said pinion and also holding the rack member yieldingly to its seat on said knife edge, said spring being of a general two armed U-form and embracing said rack member and having the free ends of its two arms connected to the fixed point to thereby avoid torque effect upon the rack member.

In testimony whereof I hereby affix my signature.

WARD W. WEIDLER.